United States Patent
Tomov et al.

(10) Patent No.: US 11,306,662 B2
(45) Date of Patent: Apr. 19, 2022

(54) METHOD FOR REGULATING A SUPPLY CIRCUIT

(71) Applicant: SAFRAN AIRCRAFT ENGINES, Paris (FR)

(72) Inventors: Petar Tomov, Moissy-Cramayel (FR); Philippe Vertenoeuil, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 408 days.

(21) Appl. No.: 16/471,065

(22) PCT Filed: Dec. 15, 2017

(86) PCT No.: PCT/FR2017/053599
§ 371 (c)(1),
(2) Date: Jun. 19, 2019

(87) PCT Pub. No.: WO2018/115653
PCT Pub. Date: Jun. 28, 2018

(65) Prior Publication Data
US 2019/0376450 A1    Dec. 12, 2019

(30) Foreign Application Priority Data
Dec. 22, 2016  (FR) ..................... 1663128

(51) Int. Cl.
*F02C 7/236* (2006.01)
*F02C 9/28* (2006.01)
(Continued)

(52) U.S. Cl.
CPC ............... *F02C 7/236* (2013.01); *F02C 9/28* (2013.01); *G01F 1/74* (2013.01); *G05B 13/04* (2013.01);
(Continued)

(58) Field of Classification Search
None
See application file for complete search history.

(56) References Cited

U.S. PATENT DOCUMENTS 4,025,238 A    5/1977 Masclet
4,512,722 A    4/1985 Mouton
(Continued)

FOREIGN PATENT DOCUMENTS

EP    0107572 A1    5/1984
FR    2268956 A1    11/1975
(Continued)

OTHER PUBLICATIONS

Search Report issued in International Application No. PCT/FR2017/053599, dated Mar. 26, 2018. (5 pages).
(Continued)

*Primary Examiner* — Ehud Gartenberg
*Assistant Examiner* — Jacek Lisowski
(74) *Attorney, Agent, or Firm* — Bookoff McAndrews, PLLC

(57) ABSTRACT

A method of regulating a feed circuit including at least a first pump and an upstream duct leading to the first pump, the method including the steps of: determining the gas content of a flow in the upstream duct feeding the first pump; and, when the value of the gas content in the upstream duct, as determined in the determining step, is greater than or equal to a predetermined threshold value, modifying the flow rate of the flow feeding the first pump.

7 Claims, 3 Drawing Sheets

(51) Int. Cl.
    *G01F 1/74* (2006.01)
    *G05B 13/04* (2006.01)
(52) U.S. Cl.
    CPC .... *F05B 2270/303* (2013.01); *F05D 2260/96* (2013.01)

(56) References Cited

U.S. PATENT DOCUMENTS

| | | | | |
|---|---|---|---|---|
| 9,052,065 | B2* | 6/2015 | Mackey | F17C 13/023 |
| 2012/0036841 | A1* | 2/2012 | Xuantian | B01D 46/442 |
| | | | | 60/287 |
| 2012/0057965 | A1* | 3/2012 | Bergamini | F04D 29/183 |
| | | | | 415/143 |
| 2012/0090331 | A1* | 4/2012 | Bilton | F02C 7/22 |
| | | | | 60/776 |
| 2012/0167594 | A1* | 7/2012 | Poisson | F02C 9/36 |
| | | | | 60/803 |
| 2015/0000298 | A1* | 1/2015 | McAlister | F02C 7/224 |
| | | | | 60/775 |
| 2016/0215778 | A1* | 7/2016 | Nohmi | F04D 29/669 |

FOREIGN PATENT DOCUMENTS

| | | |
|---|---|---|
| JP | S5999075 A | 6/1984 |
| JP | 2001280286 A | 10/2001 |
| JP | 2011157925 A | 8/2011 |
| RU | 106611 U1 | 7/2011 |
| RU | 2495265 C2 | 10/2013 |
| RU | 2627745 C2 | 8/2017 |
| WO | WO 2013/017795 A1 | 2/2013 |
| WO | 2015037669 A1 | 3/2017 |

OTHER PUBLICATIONS

Search Report issued in corresponding FR Application 1663128, dated Aug. 24, 2017. (2 pages).
Official Communication issued in corresponding Russian Application No. 2019122496 dated Mar. 9, 2021 (14 pages).
Office Action dated Apr. 27, 2021, in corresponding India Patent Application No. 201917024730 and translation (5 pages).
Official Communication in Japanese Patent Application No. 2019-534401, dated Sep. 7, 2021 (5 pages).

* cited by examiner

METHOD FOR REGULATING A SUPPLY CIRCUIT

CROSS-REFERENCE TO RELATED APPLICATION(S)

This application is the U.S. national phase entry under 35 U.S.C. § 371 of International Application No. PCT/FR2017/053599, filed on Dec. 15, 2017, which claims priority to French Patent Application No. 1663128, filed on Dec. 22, 2016.

FIELD OF THE INVENTION

The present invention relates to the field of fuel feed circuits for engines, and in particular for turbine engines, and it relates more particularly to a method of regulating a feed circuit and also to such a feed circuit in which there flows a two-phase flow.

The present invention may be used in particular for an airplane turbojet.

STATE OF THE PRIOR ART

Airplane engines conventionally include fuel feed circuits that take fuel from tanks that are generally situated in the wings of the airplane. On its path from those tanks to the engine, the fuel begins by flowing in a pipe going from those tanks and forming part of the airplane, and then in a pipe forming part of the feed circuit of the engine. The junction between those two pipes thus constitutes an interface between the airplane and the engine. Furthermore, the feed circuits of such engines include pump equipment serving to pressurize the fuel before it is fed into the combustion chamber. The pump equipment generally comprises two stages: a low pressure (LP) pump and a high pressure (HP) pump. The LP pump is generally a centrifugal pump having a bladed impeller, and proper operation of the LP pump depends strongly on it being well fed with fuel. In particular, since that type of pump is designed to operate with fuel in the liquid phase, the presence of gas in the flow of fuel runs the risk of degrading proper operation of the pump.

However, when manufacturing an engine, engine manufacturers do not necessarily know the operating conditions to which the engine is going to be subjected in flight, and in particular they do not necessarily know the detailed design of the fuel tanks and pipes of the airplane. Conversely, aircraft manufacturers do not necessarily know the type of engine that is going to be used on a given airplane, since several engine models are generally compatible with any one airplane model. As a result, the flow conditions that exist at the interface between the airplane and the engine are poorly known. Unfortunately, depending on the configuration of the airplane and on its conditions of use (layout of the ducts, altitude, type of fuel, temperature, . . . ), the flow characteristics at the interface can be disturbed. The consequences may include in particular degassing, or indeed cavitation, and also coupling between those two phenomena as appears when the pressure of the flow becomes too low. The resulting two-phase flows then include microbubbles, bubbles, and complete pockets of gas that run the risk of disturbing the operation of the LP pump, and even of damaging it irremediably, thereby leading to malfunctioning of the engine. In this respect, FIG. 1 shows a fluid flow observed on a test bench, illustrating various modes of cavitation, and in particular:

A cavitation mode involving pockets (FIG. 1A), corresponding to a flow at a low rate and a flow pressure that is relatively high. This mode is characterized by a flow that is relatively static, with cavitation pockets (gas pockets) that are stable, and that remain located at the interface between the airplane and the engine (modeled by the throat of a Venturi with diverging portions, which can also be considered as being the suction sides of blades), such that the pockets do not move along the duct and they do not reach the pump. In general manner, this type of cavitation can also form on the suction sides of the pump blades.

A turbulent cavitation mode (FIG. 1B) corresponding to a higher flow rate and a lower pressure than in the pocket cavitation mode. This mode is characterized by a high degree of vorticity, a flow that is very dynamic with cavitation pockets separating in synchronized manner at a well-defined frequency traveling downwards in the section of the duct following the flow.

These cavitating flow conditions can be harmful for proper operation of the pump and thus of the engine. Specifically, in conditions of these types, the LP pump may be fed from time to time with a fluid that is essentially in the gas phase. The vertical line T in FIG. 1B shows a section in which the flow is almost entirely gaseous. This configuration can lead in particular to the pump becoming unprimed, or indeed can lead to vibration, and thus to the appearance of a surging phenomenon that might damage the pump.

In order to avoid these types of flow condition, it would be necessary to simulate, and thus to specify correctly, the conditions with which fuel is fed at the interface between the airplane and the engine in flight. However, as mentioned above, engine manufacturers rarely have sufficient information, in particular concerning the exact configuration of the airplane, for making such simulations possible. Consequently, present-day solutions seeking to avoid these flow conditions are content with limiting the flight envelope so as to avoid any risk of having pressure that is too low (facilitating the cavitation phenomenon) at the interface between the airplane and the engine, or indeed by overdimensioning the LP pump, which has the consequence of pointlessly increasing the weight of the airplane.

There therefore exists a need for a method of regulating a feed circuit, and also for a feed circuit, enabling certain flow conditions to be avoided that are harmful for proper operation of the engine and that are free, at least in part, from the drawbacks inherent to the above-mentioned known methods.

SUMMARY OF THE INVENTION

The present disclosure provides a method of regulating a feed for a circuit comprising at least a first pump and an upstream duct leading to the first pump, the method comprising the steps of:
  determining the gas content of a flow in the upstream duct feeding the first pump; and
  when the value of the gas content in the upstream duct, as determined in the determining step, is greater than or equal to a predetermined threshold value, modifying the flow rate of the flow feeding the first pump.

In the present disclosure, the flow may be a flow of a liquid, or else a two-phase flow, i.e. a flow of a fluid comprising both a liquid phase and a gas phase comprising the vapor of the liquid and any air initially dissolved in the liquid, and the terms "upstream" and "downstream should be understood relative to the flow direction of the fluid.

The term "gas content" is used to mean the total volume fraction of the gas phase in the fluid as a whole over a portion of the upstream duct. Consequently, the predetermined value corresponds to a predetermined gas phase fraction. The threshold value may be determined so as to correspond to the appearance of particular flow conditions, e.g. corresponding to a particular cavitation mode, and in particular a turbulent cavitation mode. Thus, the determining step serves to detect the appearance of such flow conditions upstream from the first pump.

In addition, the term "modifying the flow rate" should be understood as increasing or decreasing the mass flow rate of fluid feeding the first pump. Thus, once turbulent cavitation conditions have been detected in the determining step, the mass flow rate of fluid feeding the first pump is modified. This flow rate modification leads to a modification in the pressure upstream from the first pump, and thus to a change of flow conditions. By means of this method, it thus becomes possible to avoid flow conditions that correspond to a turbulent cavitation mode that can harm the operation of the engine, by detecting the appearance of such conditions and then merely modifying the flow rate without it being necessary, for an aeroengine, to limit the flight envelope. Furthermore, such a method makes it possible to avoid overdimensioning the pump, thereby serving to avoid increasing its weight and its size.

In certain embodiments, when the gas content value determined in the determining step is greater than or equal to the predetermined threshold value, the flow rate feeding the first pump is increased.

In certain embodiments when the gas content value determined in the determining step is greater than or equal to the predetermined threshold value, the flow rate feeding the first pump is increased so as to obtain "supercavitation" conditions in the upstream duct.

Detecting a gas content value greater than or equal to the predetermined threshold value in the determining step is characteristic of the presence of a cavitation mode that presents risks for the pump, e.g. a turbulent cavitation mode. The turbulent cavitation mode generally constitutes flow conditions that are the most harmful for the pump, for proper operation of the pump and thus of the engine, given the unstable nature of this mode. Specifically, under conditions of this type, the LP pump may, occasionally, be fed with fluid that is essentially in the gas phase. This configuration can lead in particular to the pump becoming unprimed and to it being damaged.

Specifically, increasing the flow rate leads to a reduction in the pressure of said flow, this pressure reduction having the effect of accentuating the cavitation phenomenon that is already present in the upstream duct, thereby reaching a so-called "supercavitation" mode of cavitation that corresponds to a higher flow rate and a lower flow pressure than in the turbulent cavitation mode. This flow rate increase is achieved so as to obtain, deliberately, "supercavitation" conditions in the upstream duct. Specifically, as shown in FIG. 1C, these conditions are characterized by a cavitation phenomenon in the flow that is more localized and is dynamically "steady". More precisely, the liquid phase flows in the form of a jet of substantially circular section and of diameter that remains substantially constant along the duct. Thus, the generated gas remains in specific zones of the duct, in an annular flow between said liquid flow and the wall of the duct. Consequently, the flow of gas is more stable and thus less harmful to proper operation of the first pump.

In certain embodiments, the increase in the flow rate feeding the first pump is greater than 2%.

This increase in the mass flow rate of the flow by at least 2% compared with the initial flow rate makes it possible, in most applications, to go from turbulent conditions to supercavitation conditions.

In certain embodiments, the increase in the flow rate feeding the first pump is less than 15%, preferably less than 10%, more preferably less than 5%.

Small amplitude increases in the flow rate feeding the first pump can thus suffice, in most applications, to go from turbulent conditions to "supercavitation" conditions. This avoids excessively affecting the operation of the engine.

In certain embodiments, the circuit comprises a downstream duct downstream from the first pump and at least a first branch channel branching from the downstream duct and enabling a certain quantity of fluid to be bled from the downstream duct, the modification of the flow rate feeding the first pump being performed by modifying a quantity of fluid bled from the downstream duct via the first branch channel.

The downstream duct is the duct in which fluid coming from the first pump flows. The branch channel may be a channel connected transversely to the duct. Means enable a certain quantity of the fluid flowing in the downstream duct to be bled via the branch channel. The modification to the flow rate feeding the first pump can thus be performed merely by modifying the quantity of fluid that is bled from the downstream duct, at least via the first branch channel.

In certain embodiments, the flow of fluid feeding the first pump is increased by decreasing the quantity of fluid bled from the downstream duct at least via the first branch channel.

In certain embodiments, the gas content of the flow is determined by a phase measurement tool suitable for determining the gas content of a two-phase flow and arranged in the upstream duct.

In certain embodiments, the phase measurement tool comprises a plurality of coaxial electrodes, the phase measurement tool being configured to determine the gas content in the duct by measuring the electrical capacitance between the coaxial electrodes.

The phase measurement tool may comprise an outer cylinder having arranged therein a plurality of cylindrical electrodes arranged coaxially with one another and with the outer cylinder. The fluid flowing in the duct flows inside the outer cylinder along the electrodes. The electrodes serve to measure electrical capacitance and its value is representative of the gas content of the fluid flowing through the measurement tool. A phase measurement tool of this type is described in greater detail in French patent FR 2 978 828. Knowing this parameter in real time presents the advantage of being able to modify flow conditions immediately when the gas content value reaches the threshold value, with this being done by modifying the flow rate.

In certain embodiments, the quantity of fluid bled downstream from the first pump is modified by regulating the opening of a feed valve provided in the first branch channel.

The means for bleeding a certain quantity of the fluid flowing in the downstream duct via the branch channel may comprise a simple bleed valve. The degree to which said valve is open serves to regulate the quantity of fluid flowing in the branch channel, and thus the quantity of fluid bled from the downstream duct.

In certain embodiments, a control unit compares the gas content value as determined by the phase measurement tool with the predetermined critical value, and as a function of the result of that comparison, controls the degree to which the bleed valve is opened.

The control unit may be an electronic control unit (ECU). The control unit acts in autonomous manner to modify flow conditions by controlling the opening of the bleed valve as a function of a gas content value transmitted by the phase measurement tool.

In certain embodiments, the phase measurement tool presents an outside diameter that is equal to an outside diameter of the upstream duct.

In other words, the outer cylinder has a diameter equal to the outside diameter of the upstream duct. This makes it possible to avoid creating any discontinuity in the shape of the upstream duct.

In certain embodiments, the leading and trailing edges of the coaxial electrodes of the phase measurement tool are optimized so as to limit head losses in the flow.

By way of example, the leading edges may be chamfered so as to limit head losses in the flow.

In certain embodiments, the flow is a flow of fuel for a turbine engine and it comprises a liquid phase and a gas phase.

The regulation method thus serves to regulate the speed of fuel to the turbine engine.

In certain embodiments, the feed circuit comprises the first pump and a second pump downstream from the first pump, the first and second pumps being connected together by the downstream duct.

The feed circuit forms part of the turbine engine. The first pump may be a low pressure (LP) pump and the second pump may be a high pressure (HP) pump.

In certain embodiments, the feed circuit includes at least one heat exchanger arranged between the first pump and the second pump, the first branch channel branching from between the first pump and the heat exchanger, and a second branch channel branches from the downstream duct between the heat exchanger and the second pump.

The heat exchanger may be an oil/fuel or an air/fuel heat exchanger. It serves to regulate the temperature of the fuel flow before it is injected into the engine. The second branch channel may be analogous to the first branch channel. A bleed valve may be provided in the first branch channel and/or in the second branch channel. The first branch channel and the second branch channel thus serve to bleed a fuel mixture respectively upstream and downstream relative to the heat exchanger, thereby making it possible, after mixing, to regulate the temperature of the fuel that is bled off. These elements are usually present in the feed control of turbine engines. Thus, in the context of the present disclosure, the first and/or second branch channels serve to modify the flow rate in the upstream duct by modifying the quantity of fluid that is bled from the downstream duct. Bleeding in this way thus serves to modify the flow conditions in the upstream duct by using elements that are already conventionally present in such feed circuits. Consequently, there is no need to use an additional device for modifying the flow rate feeding the first pump, which serves to avoid increasing the weight of the engine.

In certain embodiments, the fuel being fed to the turbine engine is taken from a tank forming a part of a vehicle, preferably an aircraft.

In certain embodiments, the fuel bled by the first and/or second branch channel is returned back to said tank.

The fuel thus flows between the tank and the turbine engine so as to form a circulation loop.

In certain embodiments, the phase measurement tool is arranged downstream from the interface between the vehicle and the turbine engine.

In other words, the phase measurement tool is arranged in the upstream duct between the interface between the vehicle and the turbine engine, and the first pump, i.e. at the inlet to the upstream duct. This position of the phase measurement tool enables it to measure the gas content directly downstream from the interface, thus making it possible to detect flow disturbances caused at the interface, and the potential presence of turbulent cavitation.

In certain embodiments, the gas content threshold value lies in the range 50% to 80%.

A gas content value lying in this range of values can be characteristic of the presence of turbulent cavitation conditions in the flow.

In certain embodiments, the flow rate feeding the first pump is modified when the phase measurement tool measures a variation of at least 5%, preferably 10%, more preferably 15%, in the gas content in less than 1 second.

Stable cavitation modes, such as cavitation in pockets or "supercavitation", present a gas content that is substantially constant over a given section. Consequently, the phase measurement tool detecting excessive variation in the gas content can be characteristic of the presence of unstable flow conditions.

In certain embodiments, the low pressure pump is configured as a function of a predetermined flow mode. For example, the low pressure pump may be configured for flows having a gas content of up to 45%. Under such circumstances, being able to detect the presence of turbulent cavitation, and thus to modify flow conditions, makes it possible to maintain the gas content in the flow at values that are less than 45%. There is thus no need to use a low pressure pump that is overdimensioned, so as to be configured for all types of flow. The total weight of the feed circuit can thus be reduced.

The present disclosure also provides a feed circuit comprising at least a pump and an upstream duct leading to the pump, a phase measurement tool disposed in the upstream duct, a flow rate adjustment device, and a calculation unit, said calculation unit being configured, when the gas content value in the upstream duct is greater than or equal to a predetermined threshold value, to control the flow rate adjustment device so as to modify the flow rate feeding the pump. The technical advantages associated with using such a feed circuit are analogous to those associated with the above-described method of regulating a feed circuit. Furthermore, characteristics described with reference to that method can be transposed, singly or in combination, to the feed circuit.

BRIEF DESCRIPTION OF THE DRAWINGS

The invention and its advantages can be better understood on reading the following detailed description of an embodiment of the invention given in non-limiting manner. The description refers to the accompanying figures, in which.

DETAILED DESCRIPTION OF EMBODIMENTS

Figure 2:
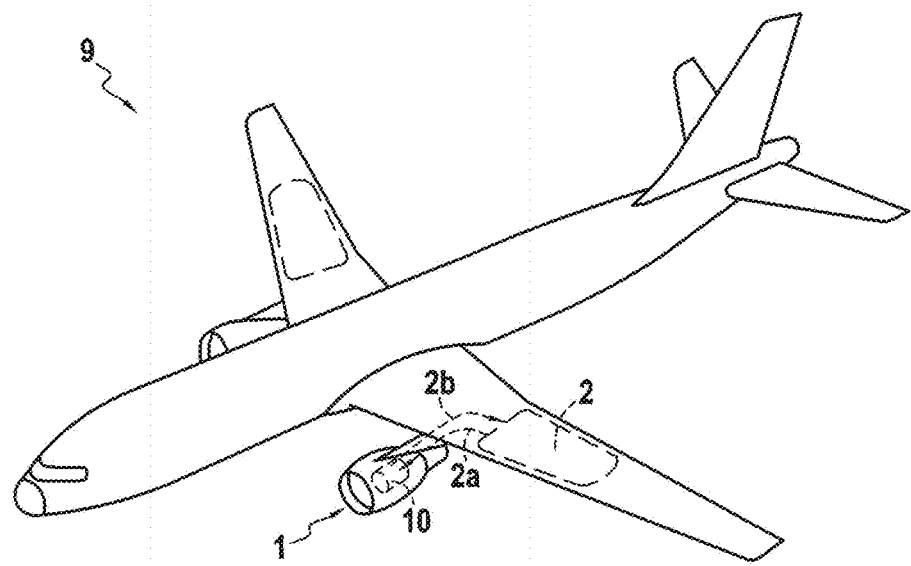
FIG. 2 shows an aircraft including a feed circuit of the present disclosure.

FIG. 2 shows an aircraft 9 having an engine 1 and a tank 2 located in a wing of the aircraft 9. The engine 1 has a feed circuit 10, which is fed by fuel taken from the tank 2. On its path from the tank 2 to the engine 1, the fuel flows initially in a first tank pipe 2a coming from the tank 2 and forming part of the aircraft 9, and then in a pipe 10a forming part of the feed circuit 10 of the engine 1. The junction between these two pipes 2a and 10a constitutes an interface I between the aircraft 9 and the engine 1.

Figure 3:
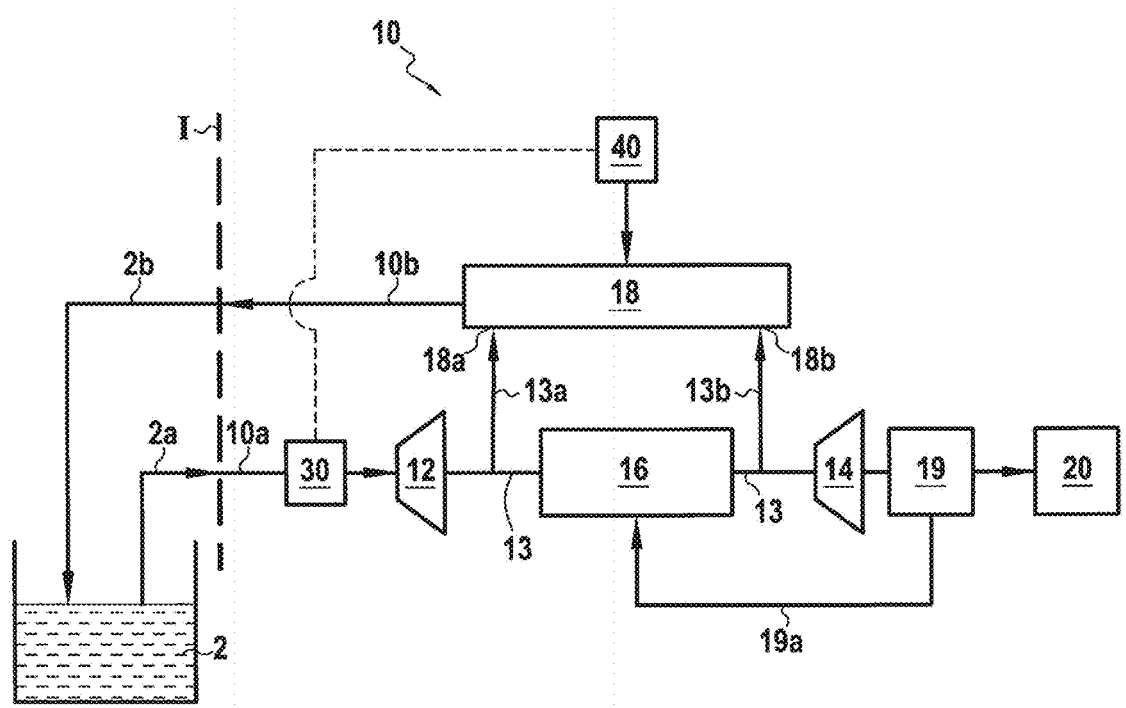
FIG. 3 is a diagram of such a feed circuit.

The feed circuit 10 is shown diagrammatically in FIG. 3. It comprises pump equipment for pressurizing the fuel before it is fed to the combustion chamber 20. This pump equipment comprises a first pump 12 (low pressure pump) and a second pump 14 (high pressure pump). The arrows in FIG. 3 show the flow direction of the fuel. The pipe 10a is an upstream duct in which the fuel coming from the tank 2 flows and it leads to the first pump 12. The first pump 12 delivers to a downstream duct 13 in which the fuel flows until it reaches the second pump 14 to which the downstream duct 13 is connected. The fuel leaving the second pump 14 is then delivered to a meter unit 19 and then to the combustion chamber 20 of the engine 1. A heat exchanger 16 is arranged on the downstream duct 13 between the first pump 12 and the second pump 14. It serves to regulate the temperature of the flow by exchanging heat between the fluid flowing in the downstream duct 13 and the fluid taken by the meter unit 19 downstream from the second pump 14 and taken to the heat exchanger 16 by a metering pipe 19a.

The feed circuit 10 also has a first branch channel 13a and a second branch channel 13b. The first and second branch channels 13a and 13b serve to take a certain quantity of fuel from the downstream duct 13. The first branch channel 13a branches from the downstream duct 13 between the first pump 12 and the heat exchanger 16. The second branch channel 13b branches from the downstream duct 13 between the heat exchanger 16 and the second pump 14.

A bleed device 18 is provided on the first and second branch channels 13a and 13b. The bleed device 18 has a first bleed valve 18a provided on the first branch channel 13a and a second bleed valve 18b provided on the second branch channel 13b. The degree to which the bleed valves 18a and 18b are open serves to regulate the quantity of fuel that flows in the first and second branch channels 13a and 13b, and thus the quantity of fuel that is bled from the downstream duct 13. The bleed device 18 is also connected to a return duct 10b in which the fuel that has been bled from the downstream duct 13 flows back towards the tank 2. The return duct 10b is itself connected to a second tank pipe 2b at the interface I. The fuel coming from the feed circuit 10 flows to the tank 2 via this second tank pipe 2b.

Figure 4:
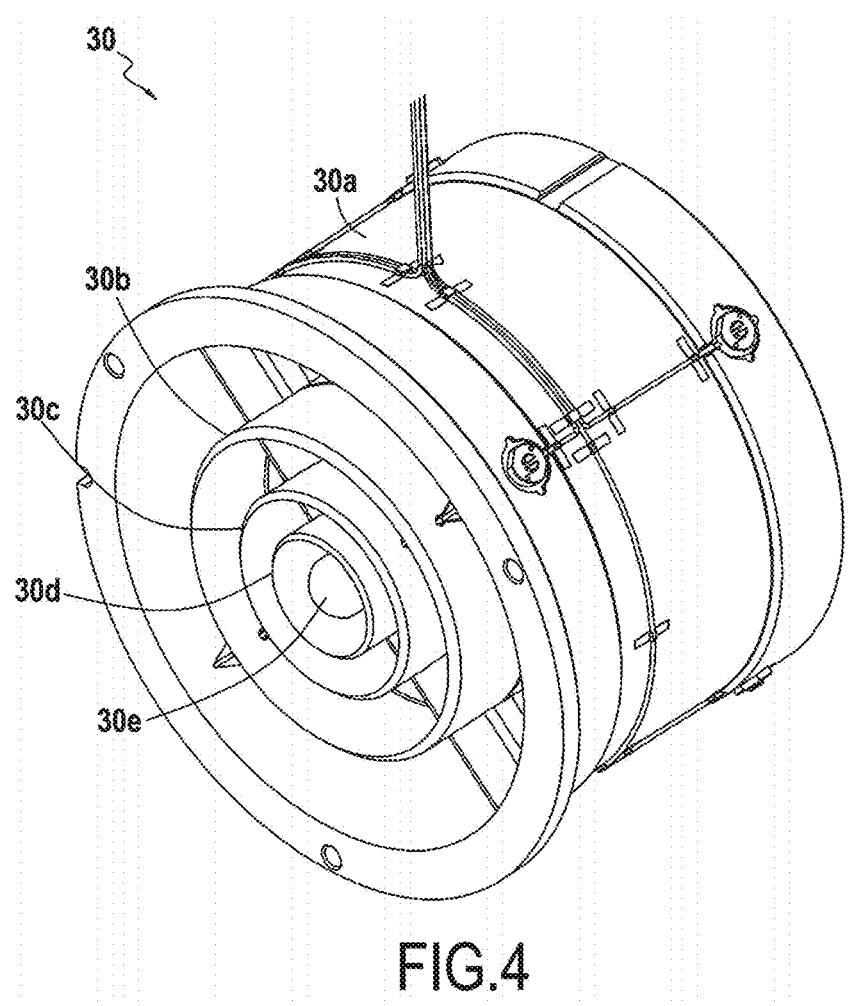
FIG. 4 shows a phase measurement tool.

A phase measurement tool 30 is arranged in the upstream duct 10a, downstream from the interface I. As shown in FIG. 4, the phase measurement tool 30 comprises a cylindrical shell 30a having a plurality of cylindrical electrodes 30b, 30c, 30d, and 30e arranged therein, which electrodes are coaxial with one another and with the cylindrical shell 30a. The fluid flowing in the upstream duct 10a flows into the phase measurement tool 30 along these electrodes. The electrodes serve to measure electrical capacitance, which presents a value that is representative of the gas content of the fluid flowing through the phase measurement tool 30.

A calculation unit 40 is connected to the phase measurement tool 30 and to the bleed device 18. By way of example, the control unit 40 may be of the full authority digital engine control (FADEC) type. The gas content of the fluid flowing in the upstream duct 10a, as measured by the phase measurement tool 30, is transmitted to the calculation unit 40. As a function of this gas content value, the calculation unit 40 controls the degree to which the first and second feed valves 18a and 18b are opened, using a method as described below.

A gas content threshold value that is characteristic of the appearance of turbulent cavitation conditions is predetermined. In this example, the predetermined threshold value corresponds to a gas content of 10%. When the calculation unit 40 determines that a gas content value in the upstream duct 10a as measured by the phase measurement tool 30 is greater than the predetermined threshold value, the calculation unit 40 deduces that turbulent cavitation conditions are present in the downstream duct 13, and consequently it controls the degree to which the first and second feed valves 18a and 18b are opened.

In the above example, the existence of a predetermined threshold value makes it possible to deduce that turbulent cavitation conditions are present. Nevertheless, other means could be used. For example, turbulent cavitation conditions in the downstream duct 13 could be detected in the event of the phase measurement tool 30 measuring a variation of at least 5% in the gas content in less than 1 second.

Partially closing the first and second feed valves 18a and 18b serves to reduce the quantity of fuel bled from the downstream duct 13 by means of the first and second branch channels 13a and 13b. This reduction in the quantity of fuel bled from the downstream duct 13 leads to an increase in the flow rate of fuel in the upstream duct 10a.

On this topic, the main manufacturers of aviation pumps assume that all of the quantity of gas is compressed on passing via the blades of the inducer and the impeller (first pump 12 in this example). Unfortunately this need not be true, since traces of cavitation can be found in the HP stage of the main pumps (second pump 14 in this example). This indicates that a certain quantity of gas is not compressed at the outlet from the first pump 12 and consequently is to be found in the downstream duct 13. This is even more true since "supercavitation" is considered as being in a saturated state for gas content, and as mentioned above, the total volume fraction of the gas phase in the fluid as a whole over a portion of the duct increases even more. As a result, the total mass of fluid in the duct is weighted by the liquid and gas phase masses, respectively. The volume of the duct remains constant in an engine configuration, so the total mass of fluid is weighted by the densities of each of the phases. The density of kerosene at ambient temperature is about 780 kilograms per cubic meter ($kg/m^3$) and the density of kerosene vapor is about 4.5 $kg/m^3$, thereby giving a ratio of about 170 between those two values, it being understood that the acceptable gas content in the low pressure pump (first pump 12 in this example) according to the ARP492C standard is 45%. Furthermore, the mass flow rate requirement of the first pump under particular conditions of speed of rotation, altitude, and temperature remains constant. Furthermore, it is impossible to filter the liquid bled from the downstream duct 13, which would imply returning a two-phase flow back towards the tank 2 and consequently reducing the total mass of the fluid upstream from the second pump 14. The two-phase mixture that is to be found in the tank 2 is thus sucked out once more by the first pump 12. For this purpose, the bleed device 18 needs to be in its new position in order to limit the bleed two-phase flow. Another effect present in fuel systems is an increase in the temperature of the kerosene as a result of its compressibility on the liquid passing through the first pump 12. More precisely, the temperature of the flow returned to the tank 2 is weighted by a mixture of "hot" fuel with "cold" fuel. The presence of gas at the outlet from the first pump 12 reduces the quantity of liquid present, thereby increasing the mean temperature of the fuel that has been bled off. Consequently, its return to the tank 2 also results in an increase in the mean fuel temperature. This increase has a beneficial effect, since cavitation is retarded as a result of the latent heat of the fluid, given that cavitation is an endothermal phenomenon (transforming liquid into vapor consumes energy and that energy is taken from the liquid, thereby creating local cooling in the pocket made up of liquid and vapor). With kerosene, the saturated vapor pressure increases at higher temperature, thereby retarding the appearance of cavitation. Consequently, the first pump 12 will suck in more liquid than two-phase mixture.

Figure 1A:
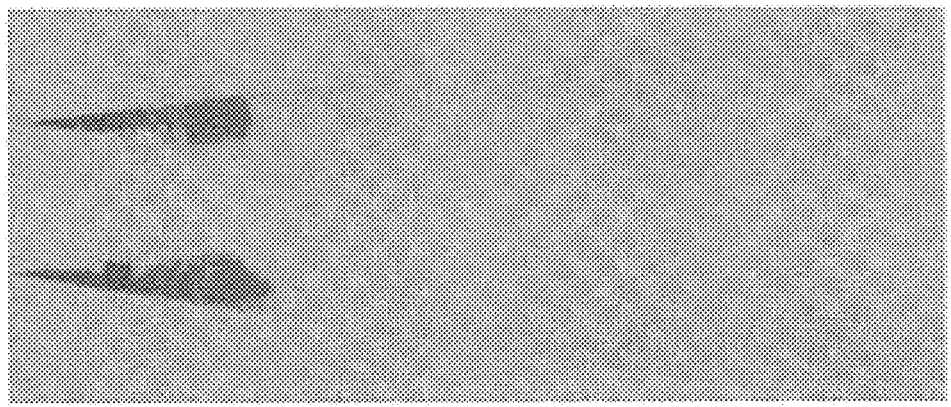
FIG. 1A shows in modeled manner a pipe in which a fluid is flowing in a pocket cavitation mode.
Figure 1B:
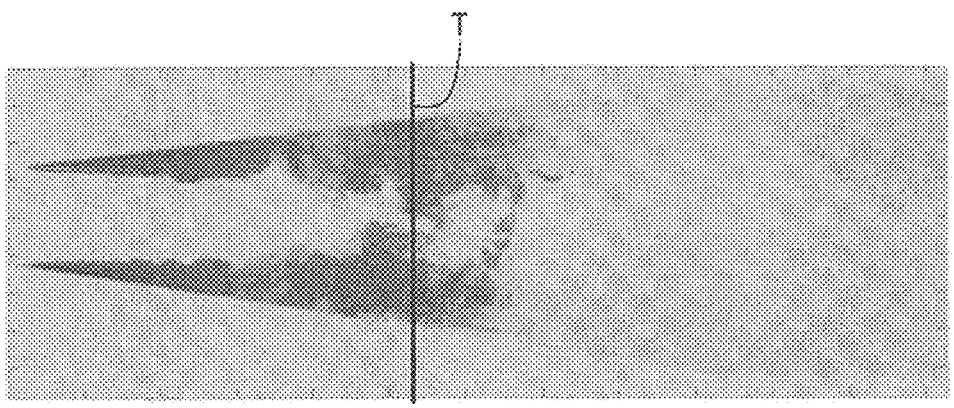
FIG. 1B shows in modeled manner a pipe in which a fluid is flowing in a turbulent cavitation mode.
Figure 1C:
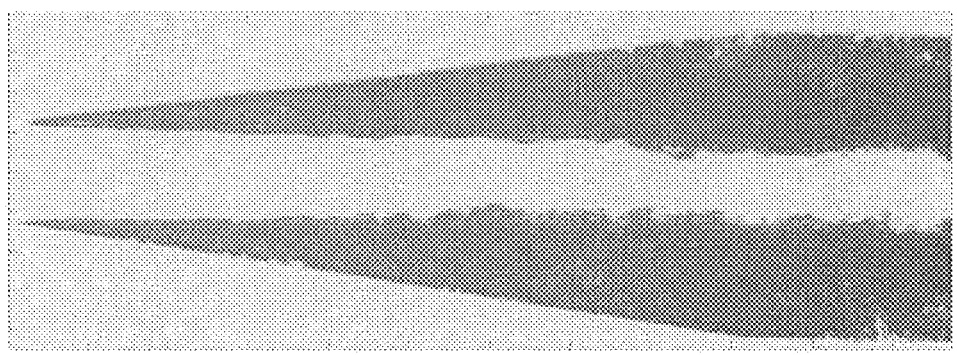
FIG. 1C shows in modeled manner a pipe in which a fluid is flowing in a supercavitation mode.

In the present example, the control unit 40 controls the degree of opening of the first and second feed valves 18a and 18b so as to enable the flow rate to be increased by 5% in the upstream duct 10a. This increase in flow rate serves to pass from a turbulent cavitation mode in the upstream duct 10a (shown in FIG. 1B), to a "supercavitation" mode (shown in FIG. 1C). The term "supercavitation" is used to designate a flow mode that is more stable and more regular, and thus more favorable to proper operation of the first pump 12 than is a turbulent cavitation mode, and that therefore serves to reduce the risk of damaging the first pump.

Although the present invention is described with reference to specific embodiments, it is clear that modifications and changes can be undertaken to those embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

It is also clear that all of the characteristics described with reference to a method can be transposed singly or in combination to a device, and conversely that all of the characteristics described with reference to a device can be transposed, singly or in combination to a method.

The invention claimed is:

1. A method of regulating a feed circuit comprising at least a first pump and an upstream duct leading to the first pump, the method comprising the steps of:
   determining a gas content of a flow in the upstream duct feeding the first pump; and
   when a value of the gas content in the upstream duct, as determined in the determining step, is greater than or equal to a predetermined threshold value, increasing a flow rate of the flow feeding the first pump so as to obtain supercavitation conditions in the upstream duct.

2. A method according to claim 1, wherein the increase in the flow rate feeding the first pump is greater than 2% and less than 15% of the flow rate.

3. A method according to claim 1, wherein the feed circuit comprises a downstream duct downstream from the first pump and at least a first branch channel branching from the downstream duct and enabling a certain quantity of fluid to be bled from the downstream duct, and wherein the modification of the flow rate of the flow feeding the first pump is performed by modifying the certain quantity of the fluid bled from the downstream duct at least via the first branch channel.

4. A method according to claim 3, wherein the flow rate of the flow feeding the first pump is increased by decreasing the quantity of the fluid bled from the downstream duct at least via the first branch channel.

5. A method according to claim 1, wherein the gas content of the flow is determined by a phase measurement tool suitable for determining the gas content of a two-phase flow and arranged in the upstream duct.

6. A method according to claim 1, wherein the predetermined threshold value for the gas content lies in the range 50% to 80% of the flow as a whole.

7. A feed circuit comprising at least a pump and an upstream duct leading to the pump, a phase measurement tool disposed in the upstream duct, a flow rate adjustment device, and a calculation unit, said calculation unit being configured, when a gas content value measured by the phase measurement tool in the upstream duct is greater than or equal to a predetermined threshold value, to control the flow rate adjustment device so as to increase a flow rate feeding the pump and to obtain supercavitation conditions in the upstream duct.

* * * * *